Figure 1:
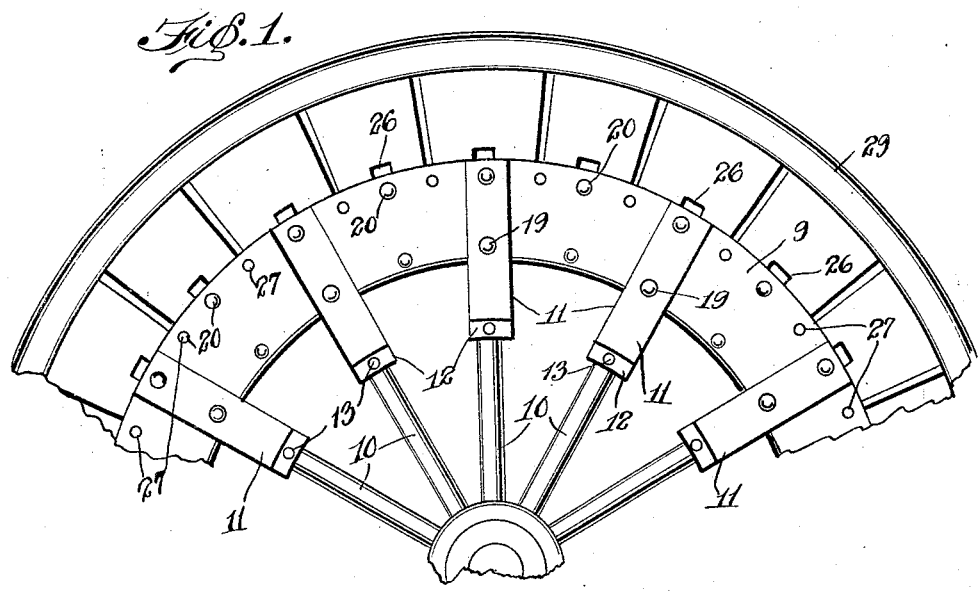

J. D. HARPER.
RESILIENT WHEEL.
APPLICATION FILED JULY 11, 1916.

1,199,377.

Patented Sept. 26, 1916.
2 SHEETS—SHEET 1.

WITNESSES
Wm H Mulligan
D T Galt

INVENTOR
James D. Harper
BY Richard Bowen
ATTORNEY

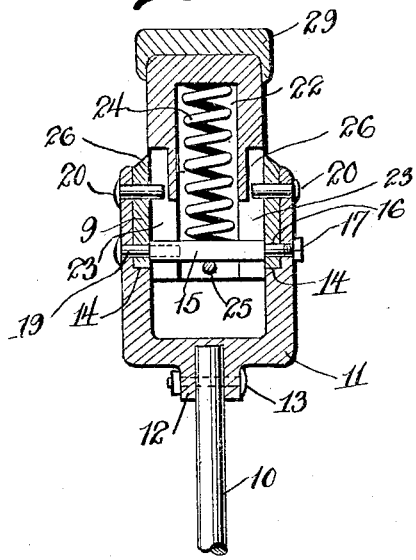
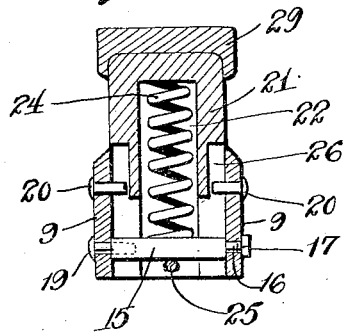
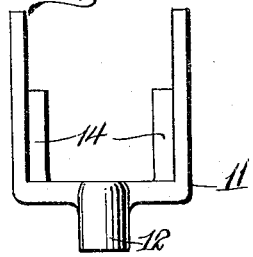
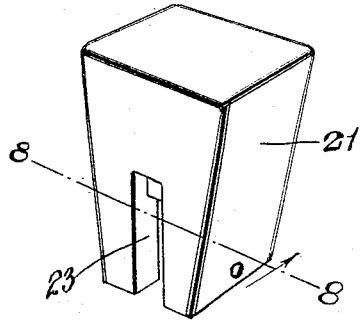
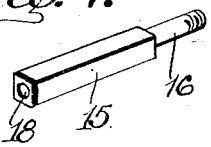
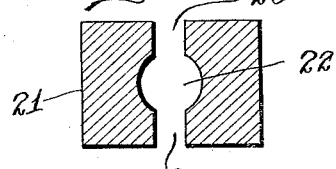

UNITED STATES PATENT OFFICE.

JAMES D. HARPER, OF SCOTT, ARKANSAS.

RESILIENT WHEEL.

1,199,377.  Specification of Letters Patent.  Patented Sept. 26, 1916.

Application filed July 11, 1916. Serial No. 108,598.

*To all whom it may concern:*

Be it known that I, JAMES D. HARPER, a citizen of the United States, residing at Scott, in the county of Pulaski and State of Arkansas, have invented certain new and useful Improvements in Resilient Wheels, of which the following is a specification.

This invention relates to improvements in resilient wheels for vehicles, and has for its primary object to improve and greatly simplify devices of this character.

A further object of the invention is to provide a wheel adapted for use in connection with vehicles which are equipped with a plurality of peripheral members resiliently supported by the wheel, whereby shocks and jars to the wheel due to travel over rough and uneven roads will be absorbed by the peripheral members and the vehicle body relieved of such shocks.

A further object of the invention is to provide a device of this character which is adapted particularly to be used in lieu of the now commonly adopted inflatable tires, whereby the trouble and expense incident to the use of pneumatic tires is obviated.

A still further and particular object of the invention is to provide a resilient wheel which is of simple and inexpensive construction, which is featured by the lack of complicated parts, which is capable of being easily and quickly adjusted to a wheel, which has the various shock absorbing units so constructed and assembled as to preclude wear, breakage or derangement of the same, and which will prove thoroughly practical in use.

With these objects in view, together with others which will appear as the description proceeds, the invention resides in the novel formation, combination and arrangement of parts, as will be described more fully hereinafter, illustrated in the drawings, and particularly pointed out in the claims.

The invention will be best understood by reference to the accompanying drawings, wherein:—

Figure 2:
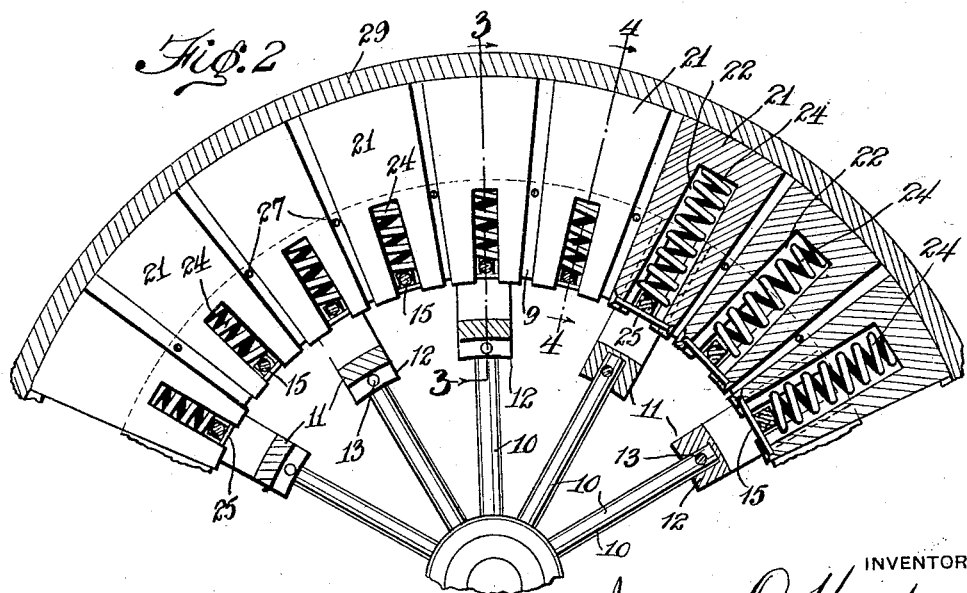

Figure 1 is a fragmentary elevation of the vehicle wheel constructed and arranged in accordance with my invention; Fig. 2 is a vertical sectional view taken through the device shown in Fig. 1; Fig. 3 is a sectional view taken on line 3—3 of Fig. 2; Fig. 4 is a similar view taken on line 4—4 of Fig. 2; Fig. 5 is a detail view of one of the ring supporting yokes; Fig. 6 is a perspective view of one of the shock absorbing blocks detached from the wheel; Fig. 7 is a similar view of one of the ring connecting bolts; and Fig. 8 is a sectional view taken substantially on line 8—8 of Fig. 6.

The invention comprehends broadly the arrangement of a pair of plates or rings at the outer extremities of the wheel spokes, the said plates being arranged concentrically with the wheel hub and in spaced relation to each other to provide an annular channel. Within this channel are arranged a plurality of shock absorbing elements, each being yieldably held in extended position, whereby the vehicle upon which the wheel is used is resiliently supported. As the wheel turns, the various radially disposed elements carried between the plates are compressed as the wheel contacts the ground, whereupon the shocks incident to the travel over rough or uneven roads are absorbed without being delivered to the vehicle axle or body. In carrying out the invention, the rim plates or rings are indicated at 9, and comprise relatively wide annular thin metallic plates. To maintain the rings in fixed position upon the wheel, the outer extremity of each spoke 10 is equipped with a yoke 11. The yokes are provided with socket portions 12 adapted to engage over the spoke ends, and the said socket portions may be secured to the said spokes in any preferred manner, such as by bolts indicated at 13. The arm portions of the yoke extend outwardly and in radial alinement with the spokes and are cut away upon their inner faces a depth equal to the thickness of the annular plates or rings 9 to form shoulders 14 against which the inner peripheral edges of the said plates are adapted to rest. The length of the cut out portions upon the yoke arms is substantially equal to the width of the rings. To rigidly secure the rings to the yoke arms, and to maintain the said rings in proper spaced relation, bolts are employed. These bolts have their shank portions 15 squared as shown, one end of the said bolts being reduced to provide stem portions 16 threaded for the reception of clamping nuts 17. The opposite end of each bolt shank is provided with an internally threaded opening 18 for the reception of a screw 19 of a diameter equal to that of the stem portion 16. The arms of the yokes 11 are provided adjacent the shoulder portion 14 with alined apertures, and the rings or plates 9 are also provided with apertures adapted to aline with those of the yokes. The alined apertures of the rings and yokes are of diameters equal to that of the stem portions of the bolts, and the distance between the ends of the shank portions of the bolts is equal to the distance between the inner faces of the rings 9 when the latter are properly seated within the cut out portions upon the interior faces of the yoke arms. The bolts are inserted between the rings 9 with the stem portions 16 extending through the alined rim and yoke arm apertures at one side of the wheel, and the nuts 17 tightened upon the said stems. The screw member 19 may then be inserted through the alined yoke arm and rim apertures at the opposite side of the wheel and tightened within the threaded apertures at the shank end of the bolts. The rings are thus tightly seated upon the shoulders 14 of the yoke arm, and are maintained against movement toward and away from each other. Screw members 20 may also be threaded through alined openings in the yoke arms and rings adjacent the outer extremities of the latter, to assist in firmly binding the rings to the yokes. These screw members extend a short distance beyond the inner faces of the rings 9, for a purpose to be hereafter detailed.

The spaced radially alined openings in the ring members for the reception of the stem portion of the bolt and for the retaining screws are arranged in circular series around the said rings, a pair of openings being alined with each spoke, and a pair being radially alined between each spoke. These last mentioned intermediate openings are also provided with screw members and bolts of the above described character, the arrangement providing a circular series of transversely disposed bolt shanks 15, and a similar series of screw members 19 and 20.

The shock absorbing or cushioning elements employed in connection with a wheel of this character comprise block members 21 arranged within the channel formed between the ring members and capable of moving radially therein. These blocks may be formed of any suitable material, and one is provided for each pair of radially alined openings in the ring members. The blocks are of relatively long formation, and extend beyond the outer peripheries of the rings 9. The inner and outer extremities of the blocks are curved to conform to the contour of the wheel, while the ends of the blocks are disposed in alinement with the wheel center. Each block is provided with a radially disposed bore or chamber 22, the said chambers opening at the inner extremities of the blocks, while the opposite ends of the chambers terminate inwardly from the outer extremities of the blocks. The sides of the blocks are provided with radially disposed slots 23, the latter communicating with the side portions of the chamber 22, and are of a width substantially equal or a trifle greater than the thickness of the shank portions 15 of the bolts. A coil spring 24 is arranged within the chamber of each block, each spring being seated at one end against the bottom of the chamber, while the opposite spring extremity rests upon the squared portion of the adjacent bolt shank 15. The springs 24 possess sufficient tensile strength to normally maintain the blocks 21 at the limit of their outward radial movement. Limiting pins 25 extend through the inner extremities of the blocks 21 from end to end, to limit the outward movement of the various blocks, the said pins engaging with the bolt shanks 15. Longitudinally disposed grooves 26 are also arranged in the side faces of the blocks 21, the said grooves being in alinement with the slots 23 and receive the inner extremities of the screw or rivet members 20. These screws 20 thus prevent circumferential movement of the block members 21. From this description, it is apparent that the blocks are yieldably maintained projected from the rings 9, but may be slid inwardly against the tension of the springs 24. The slots 23 and grooves 26 are of such length as will permit of the blocks 21 moving inwardly a considerable distance. After the pressure upon the sliding blocks has been relieved, the said blocks will again assume normal or projected position, being limited in their outward movement by engagement of the limiting pin 25 with the bolt shank 15. The power of the springs 24 is such as will firmly bind the limiting pins 25 against the bolt shanks 15 and prevent rattling of the various blocks in the annular channel between the rings. The screw members 20 maintain the various blocks in proper radial position, and prevent the latter moving or oscillating circumferentially of the wheel.

Pins or bolts 27 connect the rings 9 between the various sliding blocks, and prevent the blocks engaging each other, as well as limiting the inward sliding movement of the blocks. The outer extremities of the sliding blocks are inclosed by a rubber or other resilient tire 29, whereby the wheel is provided with a smooth tread surface.

From this construction, it is seen that I have provided a resilient wheel which is of comparatively simple construction, and which will prove thoroughly efficient in preventing shocks or jolts being transmitted to the vehicle axle and body. The various shock absorbing blocks are so arranged as to efficiently perform their functions, yet which are assembled in such manner as to preclude the possibility of breakage or derangement.

While the above is a description of the preferred embodiment of the invention, it will be understood that various changes in the minor details of construction and arrangement of parts may be resorted to without departing from the spirit of the invention or exceeding the scope of the claims.

What is claimed is:—

1. In a vehicle wheel, a pair of spaced annular rings for said wheel, bolts connecting said rings, blocks arranged between said rings and capable of sliding radially thereof, cushioning elements interposed between said bolts and blocks, substantially as described.

2. In a vehicle wheel, a pair of spaced annular rings for said wheel, bolts connecting said rings, blocks arranged between said rings for sliding movement radially of said wheel, cushioning elements interposed between said bolts and blocks, and means for limiting the outward movement of said blocks, substantially as described.

3. In a vehicle wheel, a pair of spaced annular rings for said wheel, bolts connecting said rings, blocks arranged between said rings for sliding movement radially of said wheel and each having an inwardly opening chamber, coil springs in said chambers and resting upon said bolts, and means for limiting the outward movement of said blocks, substantially as described.

4. In a vehicle wheel, a pair of spaced annular rings for said wheel, bolts connecting said rings, blocks arranged between said rings for sliding movement radially of said wheel and each having an inwardly opening chamber, coil springs in said chambers and resting upon said bolts, and a tire arranged around said wheel and inclosing the outer faces of said blocks, substantially as described.

5. In a vehicle wheel, a pair of spaced annular rings for said wheel, bolts connecting said rings and maintaining the same in spaced relation, blocks arranged between said rings for sliding movement radially of said wheel and each having an inwardly opening chamber, coil springs in each chamber and being seated upon said bolts, a resilient tire arranged around said wheel and inclosing the outer faces of said blocks and means for preventing said blocks from moving circumferentially of said wheel, substantially as described.

6. In a vehicle wheel, a pair of spaced annular rings for said wheel, bolts connecting said rings and maintaining the same in spaced relation, blocks arranged between said rings for sliding movement radially of the wheel and each having an inwardly opening chamber, springs in said chambers and engaged with said bolts to normally maintain said blocks projected, the said blocks having radially disposed grooves, and guide pins on said rings engaged in said grooves, substantially as described.

7. In a vehicle wheel, a pair of spaced annular rings, bolts connecting said rings and maintaining the same in spaced relation, blocks mounted between said rings for sliding movement radially of the wheel, each of said blocks being provided with an inwardly opening, radially disposed chamber and lateral slots communicating with the opposite sides of said chamber to be engaged by said bolts, and expansion springs in said chambers resting upon said bolts, substantially as described.

8. In a vehicle wheel, a pair of spaced annular rings, bolts connecting said rings and maintaining the same in spaced relation, blocks mounted between said rings for sliding movement radially of the wheel, each of said blocks being provided with an inwardly opening, radially disposed chamber and lateral slots communicating with the opposite sides of said chamber to be engaged by said bolts, expansion springs interposed between the bottoms of said chambers and said bolts, and means for limiting the outward movement of said blocks, substantially as described.

9. In a vehicle wheel, a plurality of yokes secured to the outer extremities of the spokes of said wheel, the inner faces of the arms of said yokes being shouldered, rings arranged in said yoke and resting upon said shoulders, bolts connecting said yoke arms and supporting said rings, blocks slidably mounted between said rings and having slots inclosing said bolts, a chamber in each block, a spring within each chamber and resting upon the adjacent bolt to maintain said blocks projected, pins connecting said rings between said blocks to limit the swinging movement of the same, and means for limiting the outward movement of said blocks, substantially as described.

In testimony whereof I affix my signature in presence of two witnesses.

JAMES D. HARPER.

Witnesses:
C. M. FLYNN,
J. A. WATTS.